(12) United States Patent
Rowe (10) Patent No.: US 8,276,174 B2
(45) Date of Patent: Sep. 25, 2012

(54) DISPLAYING ADVERTISEMENTS ON BLANK TELEVISION OUTPUT

(75) Inventor: Simon M. Rowe, Berkshire (GB)

(73) Assignee: Google Inc., Mountain View, CA (US)

( * ) Notice: Subject to any disclaimer, the term of this patent is extended or adjusted under 35 U.S.C. 154(b) by 401 days.

(21) Appl. No.: 12/578,741

(22) Filed: Oct. 14, 2009

(65) Prior Publication Data

US 2011/0088061 A1 Apr. 14, 2011

(51) Int. Cl.
- H04N 7/10 (2006.01)
- H04N 7/025 (2006.01)
- H04H 60/32 (2008.01)
- G06Q 30/00 (2006.01)

(52) U.S. Cl. ......... 725/32; 705/14.4; 705/14.41; 725/19
(58) Field of Classification Search ........................ None
See application file for complete search history.

(56) References Cited

U.S. PATENT DOCUMENTS

| 2002/0083439 A1* | 6/2002 | Eldering | 725/32 |
| 2002/0178447 A1* | 11/2002 | Plotnick et al. | 725/36 |
| 2007/0188665 A1* | 8/2007 | Watson et al. | 348/731 |
| 2009/0030802 A1* | 1/2009 | Plotnick et al. | 705/14 |

FOREIGN PATENT DOCUMENTS

| KR | 20010067029 A | 7/2001 |
| KR | 2005083182 A | 8/2005 |
| KR | 2005111407 A | 11/2005 |
| KR | 2008024300 A | 3/2008 |

OTHER PUBLICATIONS

Notification of Transmittal of the International Search Report and the Written Opinion of the International Searching Authority, or the Declaration for PCT/US2010/052752 dated Jun. 6, 2011, 9 pages.

* cited by examiner

Primary Examiner — Kristine Kincaid
Assistant Examiner — Omar S Parra
(74) Attorney, Agent, or Firm — Fish & Richardson P.C.

(57) ABSTRACT

Methods, systems, and apparatus, including computer programs encoded on a computer storage medium, for providing television advertisements while a viewing device is tuning to a channel. In one aspect, a viewing device, in response to receiving a signal to tune to a channel, selects advertisement data for an advertisement from a data storage device storing advertisement data for one or more advertisements, and generates a video signal when tuning to the channel, the video signal generated only for the duration that the viewing device is tuning to the channel and for displaying on the television device, and the video signal causing the advertisement to be displayed on the television device.

17 Claims, 6 Drawing Sheets

DISPLAYING ADVERTISEMENTS ON BLANK TELEVISION OUTPUT

BACKGROUND

This disclosure relates to television advertising.

An advertiser, such as a business entity, can purchase airtime during a television broadcast to air television advertisements. Example television advertisements include commercials that are aired during a program break, transparent overlays that are aired during a program, and text banners that are aired during a program, product placements in a program, etc.

However, viewers often switch channels when an advertisement airs, e.g., many viewers "channel surf" during commercial breaks. Additionally, viewers may change the channel after losing interest in a television program. As a result, viewers do not see all advertisements aired with television programs.

When changing a channel on a digital television device, however, the viewing device, such as a cable set top box or a satellite receiver, produces a blank television output while the viewing device tunes to the new channel. As used herein, a blank television output is a video signal that either results in no programming video signal, or a video signal that results in a "freeze frame" of the last frame of video displayed on the television device. Depending on the viewing device, the duration of the blank television output can be from 1 to 10 seconds. Furthermore, when a viewer causes the viewing device to change to a channel, the viewer is usually paying attention to the television, as the viewer is waiting for the television programming of the channel to appear on the television screen.

SUMMARY

In general, one aspect of the subject matter described in this specification can be embodied in methods that include the actions of receiving, at a viewing device, a first signal indicating a television channel change to a first channel from a second channel; selecting, by the viewing device, advertisement data for an advertisement from a data storage device storing advertisement data for one or more advertisements; generating, by the viewing device, a video signal from the advertisement data for the advertisement that causes the advertisement to be displayed on a television display device; monitoring, by the viewing device, for the reception of a second signal, the second signal indicating that the viewing device is tuned to the first channel; and providing, by the viewing device, the video signal to the television device until the reception of the second signal is monitored. Other embodiments of this aspect include corresponding systems, apparatus, and computer programs, configured to perform the actions of the methods, encoded on computer storage devices.

Another aspect of the subject matter described in this specification can be embodied in methods that include the actions of receiving, at a data processing apparatus, a plurality of reporting records from a viewing device, each reporting record specifying a channel and a time during which the view devices was tuned to the channels; determining, by the data processing apparatus, advertising targeting data from the reporting records; selecting, by the data processing apparatus, advertisement data for advertisements based the advertising targeting data, the advertisements being advertisements that are to be displayed on a television display device when the viewing device is tuned to a channel; and providing, by the data processing apparatus, the selected advertisement data to the viewing device for storage in the viewing device. Other embodiments of this aspect include corresponding systems, apparatus, and computer programs, configured to perform the actions of the methods, encoded on computer storage devices.

Another aspect of the subject matter described in this specification can be embodied in methods that include the actions of receiving a television broadcast signal for television programming when tuned to a first channel and generating a first video signal for displaying on a television device; and in response to receiving a signal to tune to a second channel: selecting advertisement data for an advertisement from the data storage device and generating a second video signal when tuning to the channel, the second video signal generated only for the duration that the viewing device is tuning to the second channel and for displaying on the television device, and the second video signal causing the advertisement to be displayed on the television device. Other embodiments of this aspect include corresponding systems, apparatus, and computer programs, configured to perform the actions of the methods, encoded on computer storage devices.

Another aspect of the subject matter described in this specification can be embodied in methods that include the actions of receiving, at the viewing device, a first signal indicating a television channel change to a first channel from a second channel; selecting, by the viewing device, advertisement data for an advertisement from a data storage device storing advertisement data for one or more advertisements; generating, by the viewing device, a video signal from the advertisement data for the advertisement that causes the advertisement to be displayed on a television display device; tuning the viewing device to the first channel; and providing, by the viewing device, the video signal to the television device while viewing device is tuning to the first channel. Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. Relevant advertisements can be provided for presentation in an environment that has a high level of viewer interest. Advertisement data can be cached locally on the viewed device to eliminate latency delays. The advertisements can be selected based on the viewer's viewing habits and interests, and provided to the viewing device in advance of presentation, e.g., during a reporting and update process that occurs when network traffic is relatively low. The advantages and features listed above are optional and not exhaustive. The advantages and features can be separately realized or realized in various combinations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Example Environment

Figure 1:
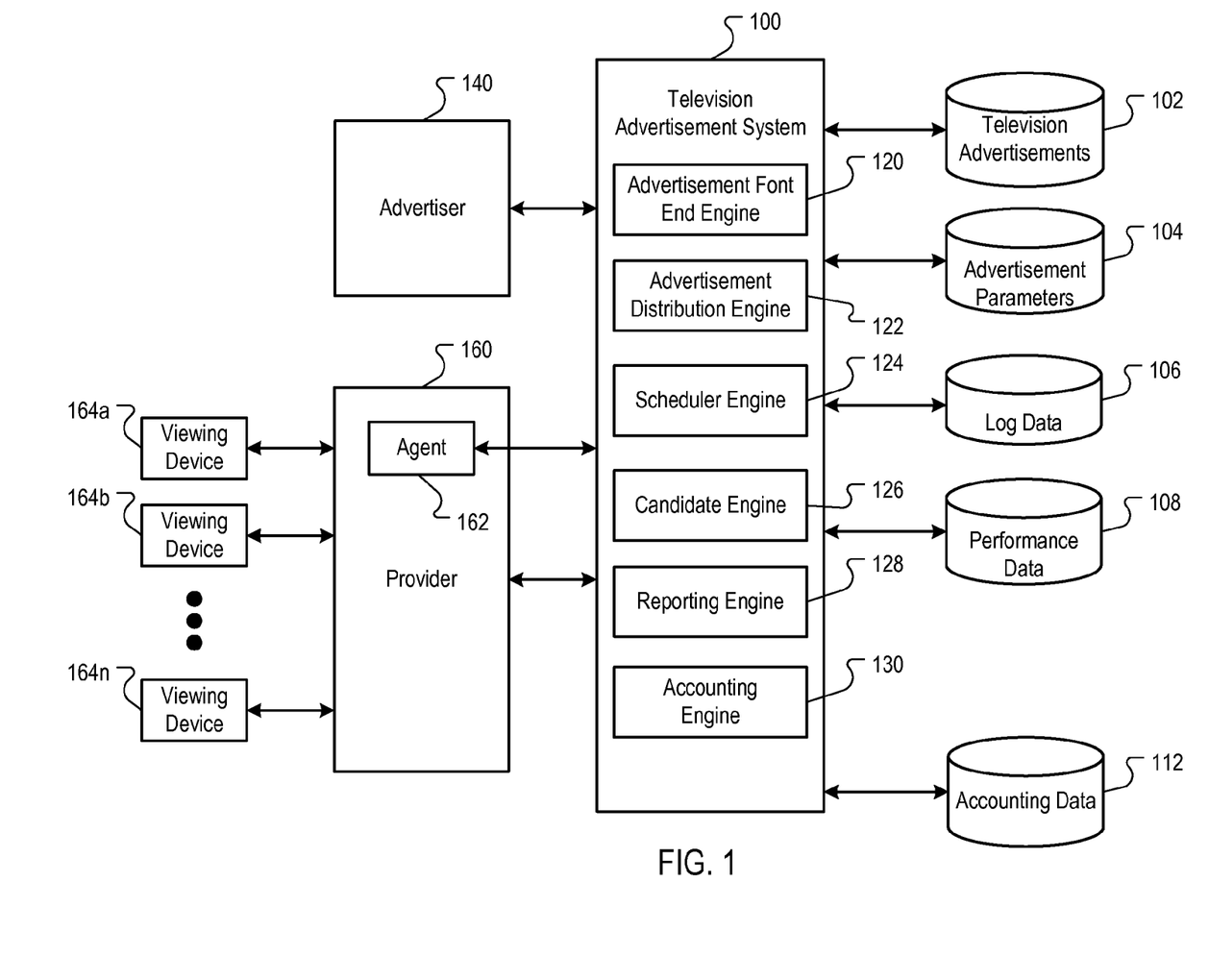
FIG. 1 is a block diagram of an example television advertisement system.

FIG. 1 is a block diagram of an example television advertisement system 100. The television advertising system 100 delivers television advertisements to viewers to facilitate operator monetization of programming and quantification of advertisement delivery to target markets. The television advertising system 100 can be implemented on one or more computer servers, and can provide and receive data over a network. Example networks include local area networks (LANs), wide area networks (WANs), telephonic networks, and wireless networks (e.g., 802.11x compliant networks, satellite networks, cellular networks, etc.). Additionally, the television advertising system 100 can communicate over several different types of networks, e.g., the Internet, a satellite network, and a telephonic network.

The television advertising system 100 receives television advertisements and advertisement campaign data from an advertiser 140, e.g., an entity that provides television advertisements. The television advertising system 100 can facilitate the provisioning of television advertisements to a television provider 160, e.g., an entity that facilitates the delivery of a television broadcast to viewers, such as a cable provider or a digital satellite provider. A provider agent 162 that facilitate communicating with the television advertising system 100 can be located at an advertising broadcast insertion location of the provider 160, e.g., at a head end of the provider.

In some implementations, the television advertising system can facilitate the presentation of programming advertisements and tuning advertisements. Programming advertisements are advertisements that are presented during television programming, e.g., advertisements during commercial breaks and overlay advertisements. Tuning advertisements are advertisements that are presented when the viewing device 164 is instructed to tune to a new channel. In some implementations, the tuning advertisements are presented only during the time that the viewing device is tuning to the new channel, i.e., before the viewing device has turned to the new channel or stream, as described in more detail below.

§1.1 Programming Advertisements

The provider agent 162 can receive advertisement availability schedules from the provider 160 and provide the advertisement availability schedules to the television advertising system 100. Example advertisement availability schedules include scheduling data related to advertisement spots, times slots, pods (groups of time slots), screen real estate (e.g., a region in a text banner or screen corner for an overlay), etc. For example, the provider agent 162 can read schedule requests, either in real time or ahead of time, and identify which schedule times the television advertising system 100 has permission to fill with advertisements provided by the television advertising system 100. The provider agent 162 can request the television advertising system 100 to identify a relevant advertisement for an identified airtime advertisement spot, e.g., an open advertisement slot or a preempted advertisement slot.

The television advertising system 100 can select candidate advertisements to air during an advertisement availability based on programming content, account advertiser bids, budgets, and any quality metrics that have been collected, e.g., conversions, viewer actions, impressions, etc. Advertisements for airing are then selected from these candidate advertisements and provided to the provider 160.

§1.2 Tuning Advertisements

A tuning advertisement is displayed during the time the viewing device 164 is tuning to the new channel. As described above, a viewing device 164, when tuning to a new channel, typically produces a blank television output signal that either results in no programming video signal, or a video signal that results in a "freeze frame" of the last frame of video displayed on the television device. Depending on the viewing device, the duration of the blank television output can be up to 10 seconds.

To take advantage of the high level of user interest during a channel tune, the television advertising system 100 can provide advertisements to the viewing devices 164 for local storage at the viewing devices 164. Each viewing device 164 includes a data storage device storing advertisement data for one or more advertisements, and television signal processing circuitry that, when tuned to a channel, provides a first video signal for displaying the television programming on a television device. Additionally, in response to receiving a signal to tune to a channel, the television processing circuitry selects advertisement data for an advertisement from the data storage device and generates a second video signal when tuning to the channel. In some implementations, the second video signal is generated only for the duration that the viewing device is tuning to the second channel and causes the advertisement to be displayed on the television device during this time.

In operation, the viewing device 164 receives a first signal indicating a television channel change to a first channel from a second channel. Indicating a channel change means that the viewing device will begin the process or, or is in the process of, tuning to a new channel. The first signal can, for example, be generated in response to a viewer action, such as the viewer selecting a new channel, or can be generated in response to receiving such a command.

In response, the viewing device 164 selects advertisement data for an advertisement from its local data store, and generates a video signal from the advertisement data for the advertisement. This video signal causes the advertisement to be displayed on a television display device while the viewing device 164 is tuning to the new channel. The viewing device 164 monitors for the reception of a second signal that indicates that the viewing device is tuned to the second channel and provides the video signal to the television device until the reception of the second signal is monitored. Example second signals include an I-frame for an MPEG stream, or an electronic signal generated by the television processing circuit indicating a synchronization or successful tuning to an incoming video signal or stream.

A tuning advertisement can be in the form of text, and image, or even a short video. The tuning advertisements can be received from the provider 160 or from the television advertisement system 100 either in-band (i.e., over one of the video channels) or out-of-band (i.e., over another channel that is separate from a video channel). Selection of tuning advertisements at the viewing device 164 and the television advertisement system 100 is described in more detail below.

§1.3 Reporting and Accounting

The provider agent 162 can thereafter provide a status to the television advertisement system 100 regarding when the advertisement aired. The provider agent 162 can also, for example, provide anonymized impression data related to viewing devices 164a-164n. Example viewing devices include set top boxes, digital video recorders and tuners, and other television processing devices that facilitate the viewing of the television signal on a television device. For example, logs related to viewing device 164 activity, e.g., set top box logs specifying channels and times during which the viewing devices were tuned to the channels, can be anonymized to remove personal information related to viewing activities and provided to the television advertisement system 100.

Based on the impression data for the airing of the advertisement, the television advertising system 100 can charge an advertiser a fee for airing the advertisement. The fee can, for example, be substantially in proportion to the number of impressions determined for a particular airing of an advertisement. Other fee determinations can also be used.

Impressions can be measured by an analysis of activity logs of the viewing devices 164. For programming advertisements, an impression can be dependent on a channel tune status when an advertisement airs on a channel. For example, an impression can occur when a viewing device 164 is tuned to a broadcast stream in which an advertisement is inserted, and the viewing device 164 remains tuned to the broadcast stream for N consecutive seconds during the actual display time of the insertion. Other tune times can also be used.

For tuning advertisements, the viewing devices 164 can generate a tuning impression record specifying the advertisement that was displayed when the viewing device was tuned from the first channel to the second channel. In some implementations, the tuning impression record is a reporting record defining a channel tune (i.e., a channel that the device was instructed to tune to) and tune time (i.e., the time the device was instructed to tune to the channel), and which has appended to the record a tuning advertisement identifier that identifies the tuning advertisement that was presented while the viewing device tuned to the new channel. Each of these records can be counted as an impression for its identified advertisement. In some implementations, an automated tuning detection process (described below) can be used to detect channel tunes that were likely generated automatically and not directly by the viewer. These automated tunings can be ignored when counting impressions for tuning advertisements.

§1.4 Television Advertising System Architecture

In some implementations, the television advertising system 100 includes an advertisement data store 102, an advertisement parameter store 104, a log data store 106, a performance data store 108, and an accounting data store 112.

The television advertisement data store 102 can, for example, include programming advertisements that can be broadcast or aired during an advertisement spot and tuning advertisements that are displayed during channel changes. Example programming advertisements include video advertisements, banner advertisements, overlay advertisements, such as logos, URLs, dynamic pricing information for an advertisement, etc., and other advertisements that can be used to convey information visually and/or aurally during a television broadcast. Example tuning advertisements include text advertisements, image advertisements, and video advertisements of short durations. The tuning advertisements can also include audio as well.

The television advertisement parameter data store 104 can, for example, include cost per action parameters, frequency values, competitive restrictions, advertising budget data, geographic data, targeting data, etc. The television advertisement parameters can, for example, be specified by the advertiser 140, and/or can be automatically updated based on the performance of advertisements during an advertisement campaign.

The log data store 106 can include data logs from viewing devices 164, e.g., set top boxes, satellite receivers, etc. The log data can include reporting data that identifies channel tunes, e.g., a channel identifier to which the viewing device was tuned, such as may occur when the viewing device 164 is processing video data to record and/or display, and channel tune times, e.g., the times that the viewing device was tuned to a channel. Other data can also be included, e.g., key presses of remote devices associated with the viewing devices 164, commands received by the viewing devices 164, and an identifier that identifies the tuning advertisement displayed in response to tuning to a new change.

The performance data store 108 can, for example, include quality data, e.g., a total number of impressions for each advertisement, or an impression rate for each advertisement, and/or other quality parameter and/or impression parameters.

The accounting data store 112 can, for example, store accounting data related to advertisements and advertisers 140. The accounting data store 112 can store such data as campaign budgets, monthly spend parameters, and account balances for advertisers.

The advertisement data store 102, advertisement parameter store 104, log data store 106, performance data store 108, and the accounting data store 112 can be implemented separately or in combination. For example, in some implementations, the advertisement data store 102, advertisement parameter store 104 and performance data store 108 can be implemented in a single advertisement database. Other combinations and/or subcombinations can also be used.

The television advertisement system 100 can include an advertisement front end engine 120, an advertisement distribution engine 122, a scheduler engine 124, a candidate engine 126, a reporting engine 128, and an accounting engine 130. The advertisement front end engine 120, advertisement distribution engine 122, scheduler engine 124, candidate engine 126, reporting engine 128, and accounting engine 130 can, for example, be distributed among a plurality of computer devices, e.g., server computers communicating over a network.

The advertisement front end engine 120 can, for example, be configured to receive advertisement data and television advertisements from the advertiser 140 and associate the advertisement data with the television advertisements. The advertisement front end is described in FIG. 2 in more detail.

The advertisement distribution engine 122 can, for example, be configured to provide approved advertisements to the television provider 160 and viewing devices 164. Provisioning of the advertisements is described in FIG. 3 in more detail.

The television advertisement scheduler engine 124 can, for example, be configured to receive a television advertisement request defining television advertisement availability from the television provider 160, and issue a request for candidate television advertisement data, e.g., data related to advertisements that are candidates for being selected to fill the advertisement availability. The television advertisement request can include geographic data, provider identification, network data, program data, and other data.

The candidate engine 126 can, for example, be configured to identify candidate television advertisement data in response to the request for candidate television advertisement data. The identification can be based on data associated with the television advertisements, such as the data stored in the advertisement parameter data store 104.

In response to receiving the candidate advertisement data, the television advertisement scheduler engine 124 can select one or more television advertisements to air during the television advertisement availability. The selection can be based on the television advertisement request and the candidate television advertisement data.

The reporting engine 128 can, for example, receive television advertisement report data from the provider 160 and determine whether the selected television advertisement aired based on the television advertisement report data, and can determine whether an impression should be attributed to the airing. Processing of the reporting data is described in FIG. 6 in more detail.

The accounting engine 130 can, for example, receive the impression data from the reporting engine 128 and generate accounting data for advertisers, e.g., the accounting data can detail fees owed to the television advertising system 100.

The advertisement front end engine 120, advertisement distribution engine 122, scheduler engine 124, candidate engine 126, reporting engine 128, and accounting engine 130 can be implemented separately or in combination.

§2.0 Television Advertisement Front End

Figure 2:
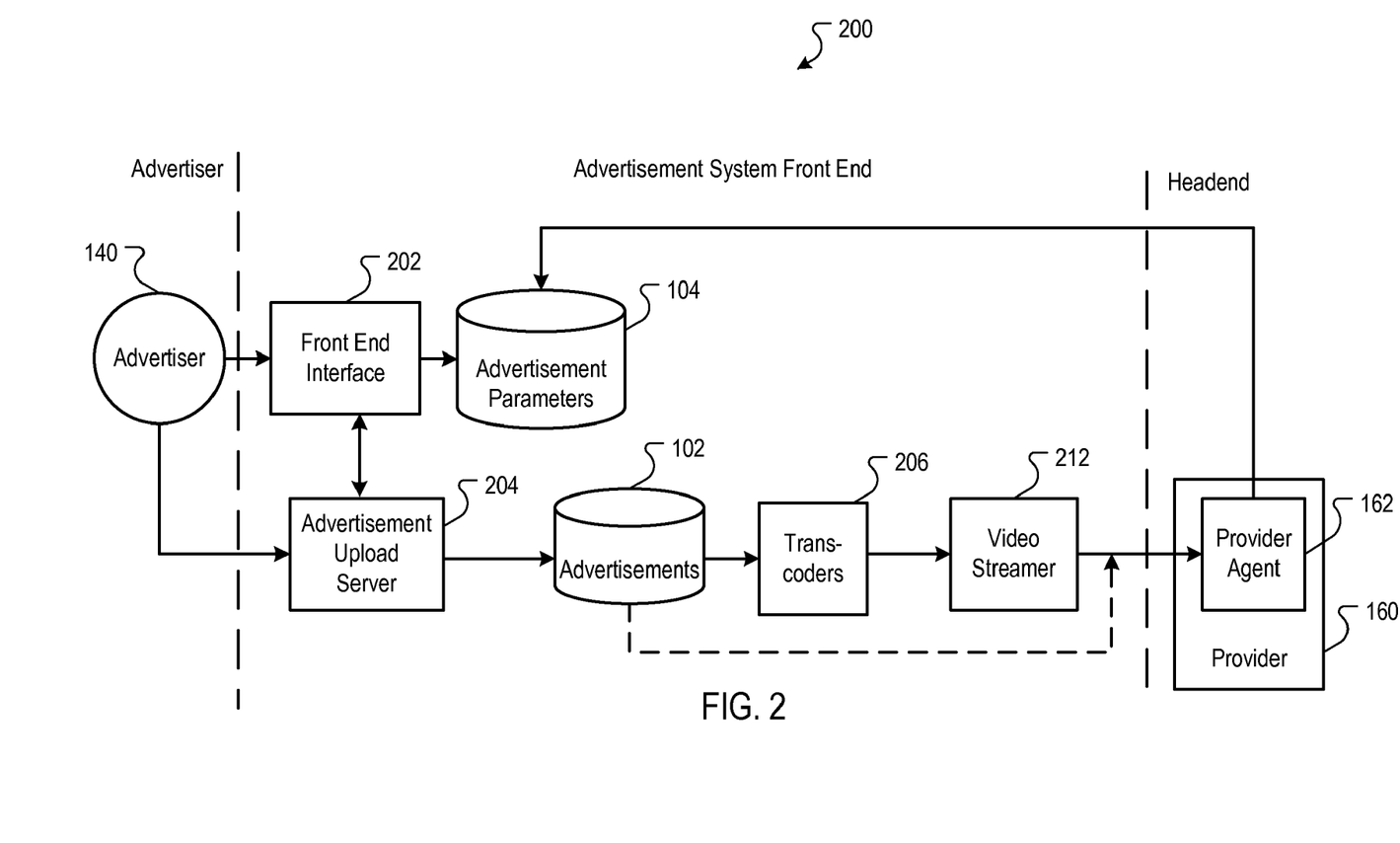
FIG. 2 is a block diagram of an example television advertisement system front end.

FIG. 2 is a block diagram of an example television advertisement front end system 200. The television advertisement front end system 200 can, for example, be implemented in the advertisement system 100 of FIG. 1.

The advertisement front end system 200 can facilitate the provisioning of advertisement data and television advertisements from the advertiser 140 or an agent of the advertiser, and can facilitate associating the advertisement data with the television advertisements. In some implementations, the advertisement front end system 200 can include a web-based front end interface 202 and an advertisement upload server 204 through which the advertiser 140 can upload television advertisements and associated campaign data associated with the advertisements, e.g., advertising budgets, targeting data, such as demographics and air times, product and/or service description data, such as vertical classifications, price ranges, subject matter, etc.

In some implementations, the advertisement upload server 204 can receive digital representations of the advertisements, e.g., video files, audio files, and text data files, that define the advertisements, e.g., video advertisements, including commercials, banners, and logo overlays, audio advertisements, and text-based advertisements.

Some of the advertisements stored in the advertisement data store 102 may require transcoding by transcoders 206 into one or more different presentation formats. For example, an advertisement may be provided in high definition and in a first aspect ratio; the advertisement may thus be transcoded to conform to another video standard, such as NTSC or PAL. The transcoded advertisements can be accessed by a video streamer 212 and provided to provider 160 for local storage. Otherwise, the advertisements can be provided to the provider 160 without use of the transcoders 206.

In some implementations, the provider agent 162 can poll the advertisement front end system 200 periodically, e.g., daily or weekly, to request any new advertisements that have been uploaded and processed by the advertisement front end system 200. Alternatively, the provider agent 162 can request new advertisements after being unable to locate an advertisement locally, or if the provider 160 indicates that an advertisement cannot be located in a local data store.

§3.0 Television Advertisement Distribution System

Figure 3:
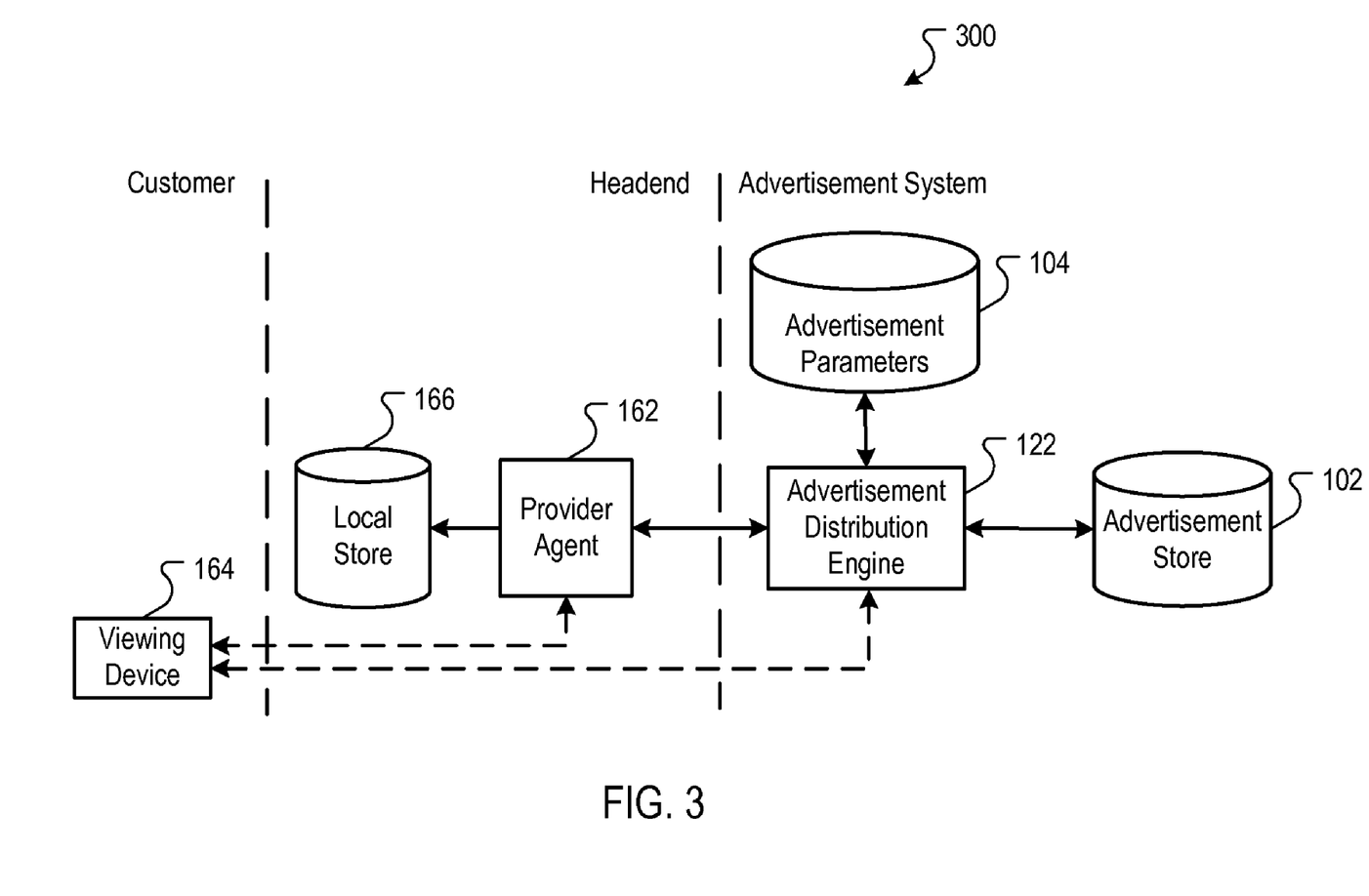
FIG. 3 is a block diagram of an example television advertisement distribution system.

FIG. 3 is a block diagram of an example television advertisement distribution system 300. The advertisement distribution system 300 can, for example, be implemented in the advertisement system 100 of FIG. 1.

The advertisement distribution system 300 facilitates the storing of advertisements on a local data store, e.g., local store 166, associated with the provider 160. The storage of the advertisement at a local store 166 can, for example, facilitate real-time or near real-time auctioning and scheduling of advertisements, e.g., auctioning and scheduling advertisements for available time slots or spots only hours or even minutes before the occurrence of the time slot.

In some implementations, the provider agent 162 can communicate with the advertisement distribution engine 122 to determine whether advertisements are available for storage on the local store 166.

If advertisements are available for download, the advertisement distribution engine 122 can establish a communication session for downloading the advertisements from the advertisement store 102 to the local store 166. Additional data can also be downloaded, e.g., an advertisement identifier, or other advertisement parameters, e.g., stored in the advertisement parameter store 104.

In some implementations, the advertisement distribution engine 122 can evaluate advertisement parameters stored in the advertisement parameter store 104 to determine to which providers 160 the advertisements should be distributed. For example, if the advertisement parameters specify that an advertisement is related to a California marketing campaign, the advertisement will only be distributed to providers 160 that service the California market.

For tuning advertisements, the advertisement distribution engine 122 can provide advertisement data for tuning advertisements to be downloaded and stored at the viewing devices 164 for later viewing during channel changes. In some implementations, the tuning advertisements are not targeted advertisements. In other implementations, the advertisement distribution engine 122 can determine advertising targeting data for individual viewing devices 164 from the reporting records associated with each viewing device 164. Using this targeting data, the advertisement distribution engine 122 selects advertisement data for tuning advertisements for downloading to a particular viewing device 164.

In some implementations, based on the television programs that were viewed, the advertisement distribution engine 122 can identify categories to which the television programs belong, and generate targeting data that causes advertisement data for an advertisement that belongs to one or more of the categories to be selected. The targeting data can be used to select advertisement data for tuning advertisements, and the data are downloaded to the viewing device 164. Thereafter, the viewing device can randomly select from the advertisement data to display an advertisement during a channel tune.

Other types of targeting data in addition to program topics can also be used. For example, the advertisement distribution engine 122 can identify a demographic associated with the viewing device based on the reporting records (e.g., a location, a user's gender (if the user opted to have some personal information exposed for targeting), or demographics associated with audiences of the television programs).

In some implementations, the advertisement distribution engine 122 can receive data identifying tuning advertisement that was displayed when a viewing device 164 was tuning to a channel. The advertisement distribution engine 122 can then select additional advertisement data for additional advertisements that belong to one or more topics in the plurality of topics and provide the additional advertisement data to the viewing device 164 for storage in the viewing device. This reduces the likelihood that the user is exposed to the same tuning advertisements during a channel change, and thus reduces ad blindness.

In some implementations, the advertisement distribution engine 122 can also select short video advertisements that meet tune time requirements of a particular viewing device 164. For example, a viewing device with an average tune time of 5 seconds can be provided with video tuning advertisements that are 4.5 seconds in duration or less. The tuning time parameters are dependent on the encoding properties of the stream and on the viewing device model. For example, a first brand of set top boxes/receivers may have an average tune time acquisition of 2 seconds; a second brand of set top boxes may have an average tune time acquisition of 5 seconds, etc.

The advertisement data for tuning advertisements can be provided to the viewing device by either the agent 162 and/or by the advertisement distribution engine 122, depending on the protocol and communication channels used.

§4.0 Example Viewing Device

Figure 4:
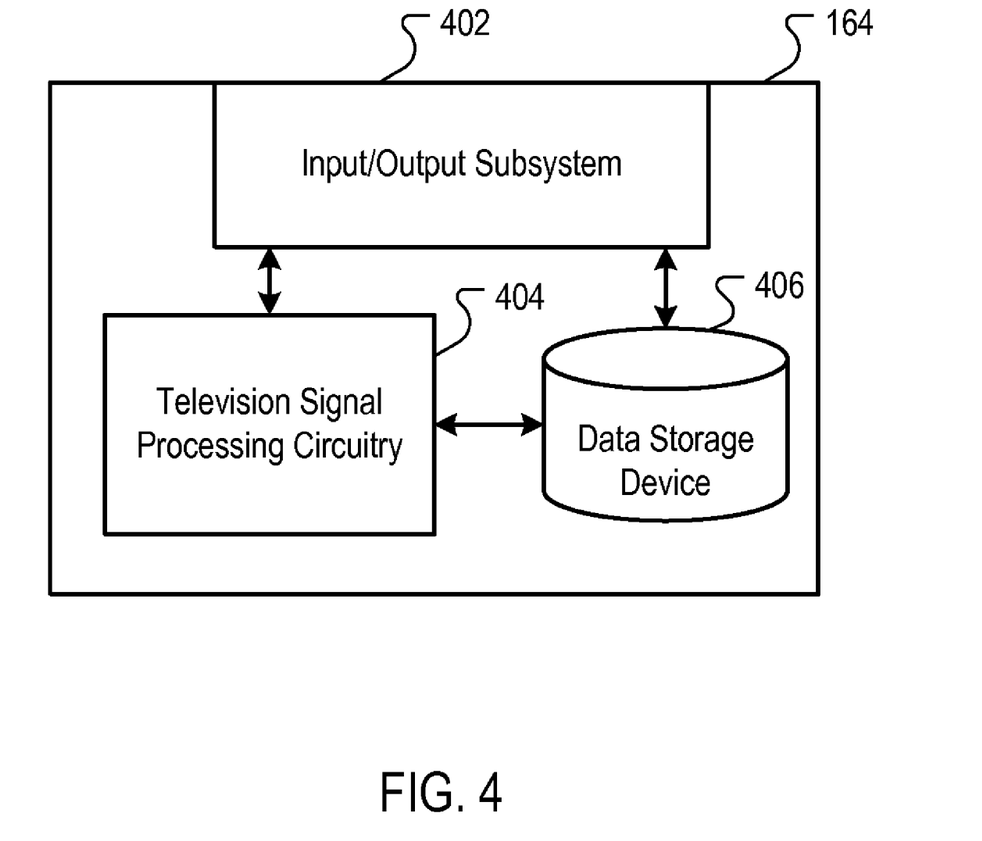
FIG. 4 is a block diagram of an example viewing device.

FIG. 4 is a block diagram of an example viewing device 164. The viewing device 164 includes an input/output (I/O) subsystem 402, television signal processing circuitry 404, and a data storage device 406.

The I/O subsystem 402 can receive video signals from the provider 160, and optionally out-of-band data from the provider 160 or the television advertising system 100, and can provide a video signal output for display on a television display device. The data storage device 406 stores advertising data for tuning advertisements.

The television processing circuitry 404 generates video signals for display on a television display device. Additionally, the television processing circuitry 404 select tuning advertisements that are displayed when the viewing device 164 is tuning to a new channel in response to a first signal that causes the viewing device to tune to a new channel or indicates the viewing device is changing to a new channel (e.g., a channel change command).

The television processing circuitry 404 selects advertisement data for an advertisement from the data storage device 406 and generates a video signal from the advertisement data for the advertisement that causes the advertisement to be displayed on a television display device. Thereafter, the television processing circuitry 404 monitors for the reception of a second signal that indicates that the viewing device 164 is tuned to the new channel, and provides the video signal for the tuning advertisement until the reception of the second signal is monitored. Examples of a second signal include an I-frame in a MPEG stream, or a signal indicating a lock to a synchronization signal. In this way, tuning advertisements are displayed instead of a blank screen, i.e., an absence of video or a freeze frame of the last video frame received before the reception of the first signal.

In some implementations, the television processing circuitry 404 can randomly select a tuning advertisement. In other implementations, the television processing circuitry 404 can select a tuning advertisement based on one or more targeting criteria. The advertising data stored in the data storage device 406 can include metadata specifying topics and demographics with which the advertisement is associated, and targeting criteria can be used to select tuning advertisements.

One example targeting criterion is selecting advertisement data for an advertisement that belonging to the category to which the first channel belongs. For example, if the first channel is a food-related channel, then a tuning advertisement related to food of kitchen products can be displayed. Another example targeting criterion is selecting advertisement data for an advertisement belonging to the category to which the channel from which the viewing is tuning away from belongs. For example, if the second channel is the sports-related channel, then a tuning advertisement related to sporting equipment can be displayed.

Another example targeting criterion is selecting advertisement data for an advertisement based on a demographic associated with the viewing device. For example, the advertisement distribution engine 122 can provide some tuning advertisements based on the geographic location of the viewing device 164, e.g., a zip code associated with a subscriber account. The television processing circuitry 404 can then, at certain times, e.g., every third channel tune, select a tuning advertisement for an advertisement that is specific to the geographic location.

Another example targeting criterion for selecting advertisement data for an advertisement that is associated with electronic programming guide text that is displayed. For example, if a user is searching through an electronic programming guide and pauses to read a description of a sporting event that is to be broadcast or is being broadcast, a region of the television display, e.g., the bottom quarter, can be used to present an advertisement related to the content of the sporting event.

In some implementations, the selection of the tuning advertisement is only in response to receiving the first signal. For example, the tuning advertisement that is selected may be based on the channel to which the viewing device is tuning to, and thus the advertisement is not selected until the data indicating the channel that the viewing device is tuning to is made available. In other implementations, the tuning advertisement is pre-selected. For example, the tuning advertisement may be selected based on the current channel to which the viewing device is tuned to, or selected based on the viewing device being tuned to a current channel for a threshold period of time, e.g., 2 minutes. In some implementations, until the viewing device is tuned to the current channel for the threshold period of time, the advertisement will be selected in response to receiving the first signal.

In response to displaying a tuning advertisement, the television processing circuitry 404 generates a tuning impression record specifying the advertisement that was displayed when the viewing device was tuned to a channel. In some implementations, the tuning impression records is a reporting record defining a channel tune (i.e., a channel that the device was instructed to tune to) and tune time (i.e., the time the device was instructed to tune to the channel), and which has appended a tuning advertisement identifier that identifies the tuning advertisement that was presented while the viewing device tuned to the new channel.

A variety of advertisements can be shown. Examples include text advertisements, image advertisements, and even video advertisements of short duration.

The viewing device 164 can be implemented as a set-top box, a satellite receiver, or other device capable of receiving video input data and outputting a video signal for display on a television device.

§5.0 Log Processing

Figure 5:
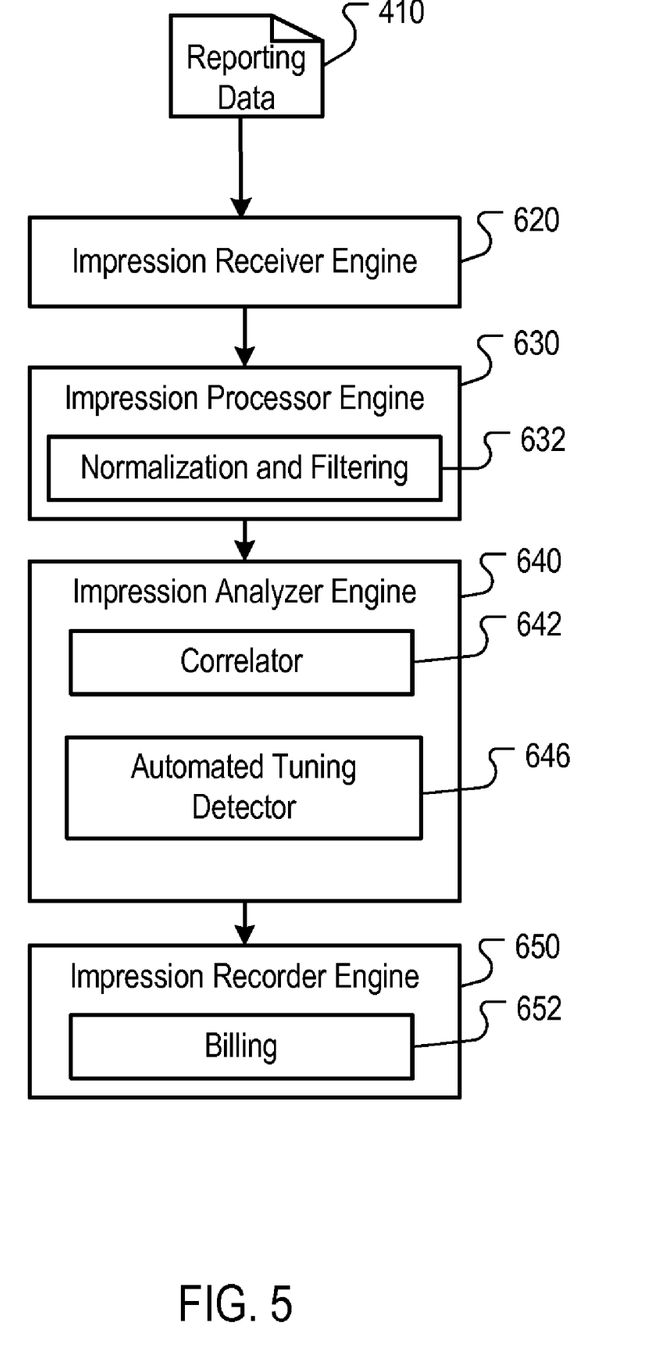
FIG. 5 is an example implementation of a log processing system in a television advertising system.

FIG. 5 is an example implementation of a log processing system 600 in a television advertising system. The log processing system 600 can, for example, be implemented in the advertisement system 100 of FIG. 1.

An impression receiver engine 620 can receive the reporting data from the television provider 160, e.g., the impression records that may include tuning advertisement identifier that identify tuning advertisements that were displayed, and any other data provided by the viewing device or television provider 160. The impression reporting data are analyzed to determine impressions for programming advertisements and tuning advertisements.

§5.1 Programming Advertisements Analysis

In another implementation, data related to actual viewings, e.g., reporting records, such as set to box log files, can be provided to the provider 160. The data can, in turn, be provided to the provider agent 162 as impression reporting data 410. The impression reporting data 410 can be used to determine an impression value related to the actual and/or estimate of the number of impressions. The impression value can be used by the accounting engine 130 to charge any fees due to the corresponding advertiser account.

In some implementations, the impression reporting data 410 can be generated from viewing device 164 logs, e.g., set top box activity data, such as reporting records. For example, user activity, including channel changes and timestamps, can be recorded and provided to the provider 160 periodically, e.g., daily or weekly, in the form of logs. The logs can, for example, be processed so that the timestamps are correlated to the times of advertisement insertions. In some implementations, each viewing device 164 that was tuned to a broadcast stream during a time at which an advertisement was inserted is counted as an impression.

The impression processor engine 630 can receive the reporting records from the impression receiver engine 620 and execute a normalization and filtering engine 632 to adjust the associated tuning times for television processing delays and to identify reliable reporting records.

In some implementations, the tune times can be adjusted according to a fixed delay and a variable delay. The fixed delay can be based on television provider encoder hardware and software, or other system implementations having a known delay. The variable delay can be based on television provider equipment that may have variable delays, e.g., analog mixers, encoding changes, etc.

An impression analyzer engine 640 can be configured to receive the normalized reporting records from the impression processor engine 630. In some implementations, the impression analyzer engine 640 can implement a correlation engine 642 to correlate the normalized reporting records with advertisement insertion records to determine reported impressions for corresponding television advertisements.

§5.2 Tuning Advertisements Analysis

For tuning advertisements, every reporting recording that includes an identifier for a tuning advertisement can be counted as an impression. However, there may be situations in which false-positives can occur, e.g., automated tuning by viewing device 164, such as in the event of recording a television program according to a schedule.

In some implementations, false-positive detection can be identified from original or normalized reporting records based on the corresponding tune times. For example, reporting records can be processed by the automated tuning detection engine 646 to distinguish between viewer-triggered channel tunes and automatically generated channel tunes. The automatically generated channel tunes can, for example, be indicative of a recording device tuning to a channel to record a program. For such channel tune characteristics, it is more likely that a viewer is not present to watch the tuning advertisement. Depending on other viewer-triggered channel tunes and/or other viewer triggered data proximate in time in to the identified automatically generated channel tunes, advertisement costs, e.g., costs per action, can be discounted, delayed or even waived with respect to a television processing device for which advertisements aired during an automated channel tune.

Viewer-triggered channel tunes can be differentiated from automatically generated channel tunes based on viewer reaction times. While both tuning types tend to cluster together at certain times, e.g., at the start and end of programming events, tune times for viewer-triggered channel tunes are loosely correlated relative to the correlation of tune times for automatically generated channel tunes. Thus a group of tightly correlated channel tunes, e.g., a set of channel tunes that occur at exactly the start time of a television program, can be identified as false-positives.

§5.3 Accounting

A reporting recorder engine 650 can, for example, store the impression data related to advertisements in the data store 610. For example, the reporting recorder engine 650 can update performance data related to an advertisement, which can, in turn, affect the quality score of the advertisement and future selections of the advertisement. In some implementations, the impression recorder engine 650 can also implement a billing process 652, e.g., a call to the accounting engine 130, which can generate corresponding advertiser billings.

§6.0 Example Process Flows

Figure 6:
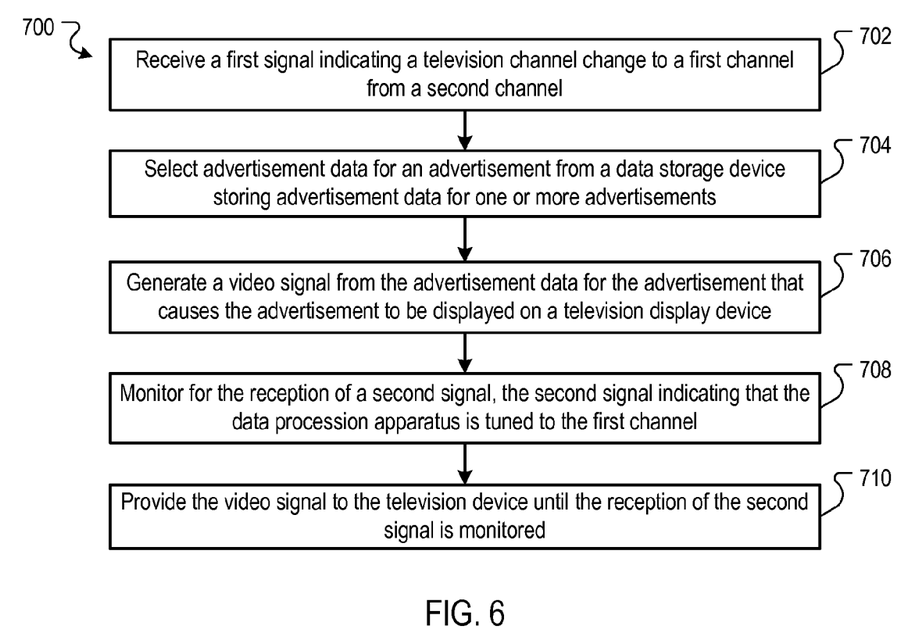
FIG. 6 is a flow diagram of an example process for selecting advertisements at a viewing device for display during a channel change.

FIG. 6 is a flow diagram of an example process 700 for selecting advertisements at a viewing device for display during a channel change. The example process 700 can be implemented in a viewing device 164.

The process 700 receives a first signal indicating a television channel change to a first channel from a second channel (702). For example, the television processing circuitry 404 of the viewing device 164 can receive a signal generated by a remote control and that causes the viewing device 164 to tune to another channel.

The process 700 selects advertisement data for an advertisement from a data storage device storing advertisement data for one or more advertisements (704). For example, the television processing circuitry 404 of the viewing device 164 can select advertisement data from the data storage device 406. The advertisement data can be randomly selected, or selected, in part, based on one or more of the channels being tuned to, the channel that was tuned to when the first signal was received, and demographics associated with the viewing device.

The process 700 generates a video signal from the advertisement data for the advertisement that causes the advertisement to be displayed on a television display device (706). For example, the television processing circuitry 404 of the viewing device 164 can generate a video signal that causes the television display device to display the advertisement.

The process 700 monitors for the reception of a second signal, the second signal indicating that the data processing apparatus is tuned to the first channel (708). For example, the television processing circuitry 404 of the viewing device 164 can monitor for an I-frame or a signal indicating a synchronization to a video signal.

The process 700 provides the video signal to the television device until the reception of the second signal is monitored (710). For example, the television processing circuitry 404 of the viewing device 164 can continue to provide the video signal that causes the television display device to display the advertisement until the second signal is monitored.

Figure 7:
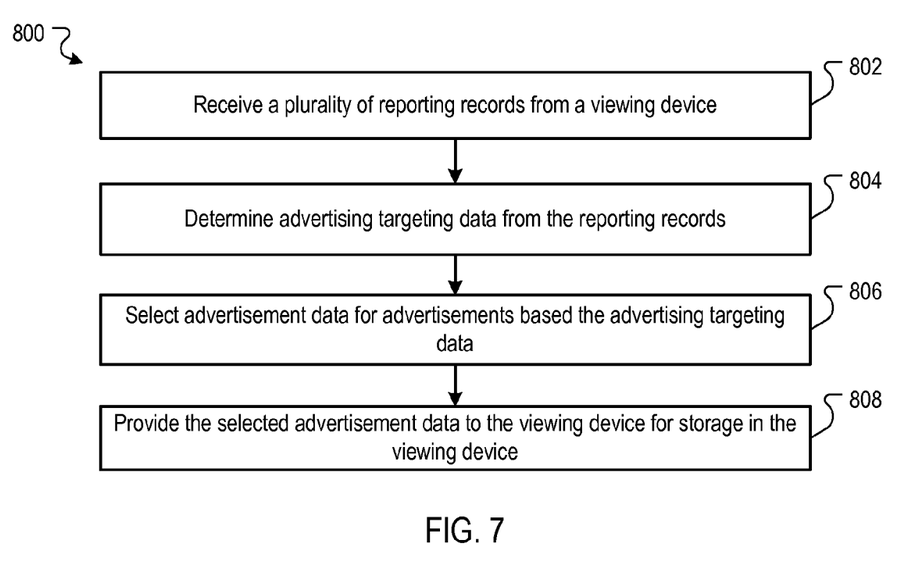
FIG. 7 is a flow diagram of an example process for selecting advertisements to provide to a viewing device for display during a channel change.

FIG. 7 is a flow diagram of an example process 800 for selecting advertisements to provide to a viewing device for display during a channel change. The example process 800 can be implemented in a television advertising system 100.

The process 800 receives a plurality of reporting records from a viewing device (802). For example, the advertisement distribution engine 122 can receive reporting records either directly from the viewing devices 164 or from providers 160.

The process 800 determines advertising targeting data from the reporting records (804). For example, the advertisement distribution engine 122 can determine from the reporting records television programs that were viewed by use of the viewing devices 164 and demographics associated with the viewing devices.

The process 800 selects advertisement data for advertisements based on the advertising targeting data (806). For example, the advertisement distribution engine 122 can select advertisement data for each viewing device 164 based on the targeting data for that viewing device.

The process 800 provides the selected advertisement data to the viewing device for storage in the viewing device (808). For example, the advertisement distribution engine 122 can provide the selected advertisement data for a viewing device 164 directly to the viewing device, or can provide the selected advertisement data for a viewing device 164 to a provider 160 that provides data to the viewing device.

The examples above describe the use of tuning advertisements. However, other types of content can also be provided. For example, instead of advertisements, content related to the interests defined by the viewing habits of the viewer can be shown. For example, if the viewer's viewing habits indicate an interest in comedies, then humorous video clips of short duration can be shown. Likewise, if the viewer's viewing habits indicate an interest in sports, e.g., football, then video clips or still images of particular football teams can be shown.

In another implementation, a theme can be defined by the user, and images and stills can be shown during tuning events. The viewer can use a user interface, much like an electronic program guide, to define a theme. The interface can show a collection of topics arranged in a hierarchal manner. A user can select a topic for a theme, and the television system can provide content related to that topic for viewing during tuning events. For example, assume a viewer has an interest in European History, and in the Napoleonic wars in particular. The viewer can select the topic in the path hierarchy:

History/Nineteenth Century/Conflicts/Napoleonic Wars

Thereafter, when changing channels, content related to the Napoleonic Wars is shown. For example, when changing a channel, an image of Hillingford's "Wellington at Waterloo" can be shown. Other images can also be shown, as can text that lists various facts about the Napoleonic wars.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with some implementations of the subject matter described is this specification, or any combination of one or more such back end, middleware, or front end components. The components of the system can be interconnected by any form or medium of digital data communication, e.g., a communication network. The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method implemented in a viewing device, comprising:
receiving, at the viewing device, a first signal indicating a television channel change to a first channel from a second channel;
determining that the viewing device has been tuned to the second channel for a threshold period of time and in response to the determination, selecting, by the viewing device, advertisement data for an advertisement from a data storage device storing advertisement data for one or more advertisements, the selection of the advertisement data for the advertisement based on a category to which the second channel belongs;
generating, by the viewing device, a video signal from the advertisement data for the advertisement that causes the advertisement to be displayed on a television display device;
monitoring, by the viewing device, for the reception of a second signal, the second signal indicating that the viewing device is tuned to the first channel; and
providing, by the viewing device, the video signal to the television device until the reception of the second signal is monitored.

2. The method of claim 1, further comprising:
determining a demographic with which the viewing device is associated; and
wherein pre-selecting advertisement data for the advertisement further comprises selecting advertisement data for an advertisement that is associated with the demographic.

3. The method of claim 1, further comprising:
receiving, at the viewing device, the advertisement data for the one or more advertisements from an advertisement provider over an advertising communication that is separate from a television programming communication, the television programming communication be a communication of advertisement data for a television program.

4. The method of claim 1, further comprising:
generating, by the viewing device, a tuning impression record specifying the advertisement that was displayed when the viewing device was tuned from the first channel to the second channel.

5. The method of claim 1, wherein the advertisement data for the advertisement is advertisement data that causes text to be displayed on a television display device.

6. The method of claim 1, wherein the advertisement data for the advertisement is advertisement data that causes an image to be displayed on a television display device.

7. The method of claim 6, wherein the advertisement data comprises a graphic.

8. The method of claim 1, wherein the advertisement data for the advertisement is advertisement data that causes a video to be displayed on a television display device.

9. The method of claim 1, wherein the second signal comprises an I-frame in an MPEG stream.

10. The method of claim 1, wherein the viewing device is a set top box, and the data storage device is included in the set top box.

11. The method of claim 1, wherein the selecting of advertisement data for the advertisement from the data storage device is only in response to receiving the first signal.

12. A method implemented in a viewing device, comprising:
receiving, at the viewing device, a plurality of first signals, each first signal respectively indicating a television channel change to a respective first channel from a respective second channel;
for each first signal, determining whether the viewing device has been tuned to the respective second channel for a threshold period of time;

for each first signal for which the viewing device has been tuned to the respective second channel for the threshold period of time, selecting advertisement data for an advertisement based on a category to which the respective second channel belongs;

for each first signal for which the viewing device has not been tuned to the respective second channel for the threshold period of time, selecting the advertisement data based on a category to which the respective first channel belongs;

for each first signal:
  generating, by the viewing device, a video signal from the advertisement data for the advertisement that causes the advertisement to be displayed on a television display device;
  monitoring, by the viewing device, for a reception of a second signal, the second signal indicating that the viewing device is tuned to the first channel; and
  providing, by the viewing device, the video signal to the television device until the reception of the second signal is monitored.

13. The method of claim 12, wherein selecting the advertisement data in response to receiving the first signal comprises:
  determining a category to which the first channel belongs; and
  selecting advertisement data for an advertisement that belongs to the category to which the first channel belongs.

14. A viewing device, comprising:
  a data storage device storing advertisement data for one or more advertisements; and
  television signal processing circuitry that performs operations comprising:
    receive a television broadcast signal for television programming when tuned to a first channel and generate a first video signal for displaying the television programming on a television device; and
    in response to receiving a tuning signal to tune to a second channel:
      determine that the viewing device has been tuned to the first channel for a threshold period of time;
      in response to determining that the viewing device has been tuned to the first channel for the threshold period of time, select advertisement data for and advertisement from the data storage device, the selection based on a category to which the first channel belongs; and
      generate a second video signal when tuning to the second channel, the second video signal generated only for the duration that the viewing device is tuning to the second channel, and the second video signal causing the advertisement to be displayed on the television device.

15. The viewing device of claim 14, wherein the pre-selected advertisement data for the advertisement is advertisement data that causes text to be displayed on a television display device.

16. A method implemented in a viewing device, comprising:
  receiving, at the viewing device, a first signal indicating a television channel change to a first channel from a second channel;
  determining that the viewing device has been tuned to the second channel for a threshold period of time and in response to the determination, selecting, by the viewing device, advertisement data for an advertisement from a data storage device storing advertisement data for one or more advertisements, the selection of the advertisement data for the advertisement based on a category to which the second channel belongs;
  generating, by the viewing device, a video signal from the advertisement data for the advertisement that causes the advertisement to be displayed on a television display device;
  tuning the viewing device to the first channel; and
  providing, by the viewing device, the video signal to the television device while viewing device is tuning to the first channel.

17. The method of claim 16, wherein providing the video signal to the television device while viewing device is tuning to the first channel comprises providing the video signal to the view device until the viewing device is tuned to the first channel.

* * * * *

UNITED STATES PATENT AND TRADEMARK OFFICE
CERTIFICATE OF CORRECTION

| | | |
|---|---|---|
| PATENT NO. | : 8,276,174 B2 | Page 1 of 1 |
| APPLICATION NO. | : 12/578741 | |
| DATED | : September 25, 2012 | |
| INVENTOR(S) | : Simon M. Rowe | |

It is certified that error appears in the above-identified patent and that said Letters Patent is hereby corrected as shown below:

In Column 18, Line 41, Claim 17, delete "view" and insert -- viewing --, therefor.

Signed and Sealed this
Fourth Day of December, 2012

David J. Kappos
*Director of the United States Patent and Trademark Office*